United States Patent
Zhu et al.

(10) Patent No.: US 9,531,985 B2
(45) Date of Patent: Dec. 27, 2016

(54) MEASURING USER ENGAGEMENT OF CONTENT

(71) Applicant: SAMSUNG ELECTRONICS CO., LTD, Suwon, Gyeonggi-Do (KR)

(72) Inventors: Yingnan Zhu, Irvine, CA (US);
Praveen Kashyap, Irvine, CA (US);
Fabio Gava, Ladera Ranch, CA (US);
Nan Yang, Newport Beach, CA (US);
Meghana Koushik, Irvine, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 350 days.

(21) Appl. No.: 13/841,702

(22) Filed: Mar. 15, 2013

(65) Prior Publication Data

US 2014/0270683 A1   Sep. 18, 2014

(51) Int. Cl.
| H04N 9/80 | (2006.01) |
| --- | --- |
| H04H 60/33 | (2008.01) |
| H04N 5/77 | (2006.01) |
| H04N 21/442 | (2011.01) |
| H04N 21/45 | (2011.01) |
| H04N 9/82 | (2006.01) |
| H04N 21/422 | (2011.01) |
| H04N 21/4223 | (2011.01) |
| H04N 21/466 | (2011.01) |
| H04N 21/84 | (2011.01) |
| G06F 17/30 | (2006.01) |
| H04N 5/775 | (2006.01) |
| H04N 5/44 | (2011.01) |

(52) U.S. Cl.
CPC .......... *H04N 5/77* (2013.01); *G06F 17/30032* (2013.01); *H04N 9/8205* (2013.01); *H04N 21/4223* (2013.01); *H04N 21/42202* (2013.01); *H04N 21/42203* (2013.01); *H04N 21/44218* (2013.01); *H04N 21/44222* (2013.01); *H04N 21/4532* (2013.01); *H04N 21/4662* (2013.01); *H04N 21/4667* (2013.01); *H04N 21/84* (2013.01); *H04N 5/775* (2013.01); *H04N 2005/4428* (2013.01)

(58) Field of Classification Search
USPC ................................. 386/239–262; 725/9–21
See application file for complete search history.

(56) References Cited

U.S. PATENT DOCUMENTS

| 8,473,975 B1* | 6/2013 | Besehanic | H04N 21/44218 725/10 |
| --- | --- | --- | --- |
| 2005/0163481 A1* | 7/2005 | Hirai | G11B 27/105 386/248 |
| 2007/0279427 A1* | 12/2007 | Marks | 345/581 |
| 2008/0313040 A1* | 12/2008 | Rose | G06Q 30/02 705/14.69 |

(Continued)

*Primary Examiner* — Hung Dang
(74) *Attorney, Agent, or Firm* — Sherman IP LLP; Kenneth L. Sherman; Hemavathy Perumal (57) ABSTRACT

A system for measuring user engagement of content comprises an electronic device for playing a piece of content, at least one sensor for capturing data relating to environment context and user activity during playback of the piece of content, and an engagement measurement application for measuring user engagement of the piece of content. The engagement measurement application measures user engagement of the piece of content based on data captured by the sensors.

30 Claims, 7 Drawing Sheets

(56) References Cited

U.S. PATENT DOCUMENTS

| | | | |
|---|---|---|---|
| 2009/0070798 A1* | 3/2009 | Lee | A61B 5/1113 725/10 |
| 2009/0293080 A1* | 11/2009 | Ramanathan | G02B 6/29374 725/20 |
| 2010/0010997 A1* | 1/2010 | Amidon | G06F 17/30038 707/E17.002 |
| 2010/0205628 A1* | 8/2010 | Davis et al. | 725/25 |
| 2010/0207877 A1* | 8/2010 | Woodard | G06F 3/013 345/156 |
| 2013/0127980 A1* | 5/2013 | Haddick et al. | 348/14.08 |
| 2013/0268954 A1* | 10/2013 | Hulten | H04N 21/442 725/12 |
| 2014/0007148 A1* | 1/2014 | Ratliff et al. | 725/12 |
| 2014/0150002 A1* | 5/2014 | Hough | H04N 21/4415 725/9 |
| 2014/0258863 A1* | 9/2014 | Woods | G06F 3/0484 715/716 |
| 2014/0304726 A1* | 10/2014 | Hansen | H04N 21/251 725/14 |

\* cited by examiner

MEASURING USER ENGAGEMENT OF CONTENT

TECHNICAL FIELD

One or more embodiments relate generally to user profiling, and in particular to measuring user engagement of content.

BACKGROUND

Content recommendation systems provide content recommendations to a user. Some content recommendation systems prove content recommendations based on explicit user feedback. Other content recommendation systems provide content recommendations based on similarities between prior content consumed by a user and content the user has not yet consumed.

SUMMARY

One embodiment provides a system for measuring user engagement of content. The system comprises an electronic device for playing a piece of content, at least one sensor for capturing data relating to environment context and user activity during playback of the piece of content, and an engagement measurement application for measuring user engagement of the piece of content. The engagement measurement application measures user engagement of the piece of content based on data captured by the sensors.

One embodiment provides a method for measuring user engagement of content. The method comprises playing a piece of content using an electronic device, capturing data relating to environment context and user activity during playback of the piece of content, and measuring user engagement of the piece of content based on the data captured.

One embodiment provides a non-transitory computer-readable medium having instructions which when executed on a computer perform a method comprising playing a piece of content, capturing data relating to environment context and user activity during playback of the piece of content, and measuring user engagement of the piece of content based on data captured.

One embodiment provides an apparatus for measuring user engagement of content. The apparatus comprises an engagement measurement application configured to receive data relating to environment context and user activity during playback of a piece of content, and measure user engagement of the piece of content based on the data received.

These and other aspects and advantages of one or more embodiments will become apparent from the following detailed description, which, when taken in conjunction with the drawings, illustrate by way of example the principles of one or more embodiments.

BRIEF DESCRIPTION OF THE DRAWINGS

For a fuller understanding of the nature and advantages of one or more embodiments, as well as a preferred mode of use, reference should be made to the following detailed description read in conjunction with the accompanying drawings, in which.

DETAILED DESCRIPTION

The following description is made for the purpose of illustrating the general principles and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One or more embodiments relate generally to user profiling, and in particular to measuring user engagement of content. One embodiment provides a system for measuring user engagement of content. The system comprises an electronic device for playing a piece of content, at least one sensor for capturing data relating to environment context and user activity during playback of the piece of content, and an engagement measurement application for measuring user engagement of the piece of content. The engagement measurement application measures user engagement of the piece of content based on data captured by the sensors.

One embodiment provides a method for measuring user engagement of content. The method comprises playing a piece of content using an electronic device, capturing data relating to environment context and user activity during playback of the piece of content, and measuring user engagement of the piece of content based on the data captured.

One embodiment provides a non-transitory computer-readable medium having instructions which when executed on a computer perform a method comprising playing a piece of content, capturing data relating to environment context and user activity during playback of the piece of content, and measuring user engagement of the piece of content based on data captured.

One embodiment provides an apparatus for measuring user engagement of content. The apparatus comprises an engagement measurement application configured to receive data relating to environment context and user activity during playback of a piece of content, and measure user engagement of the piece of content based on the data received.

Figure 1:
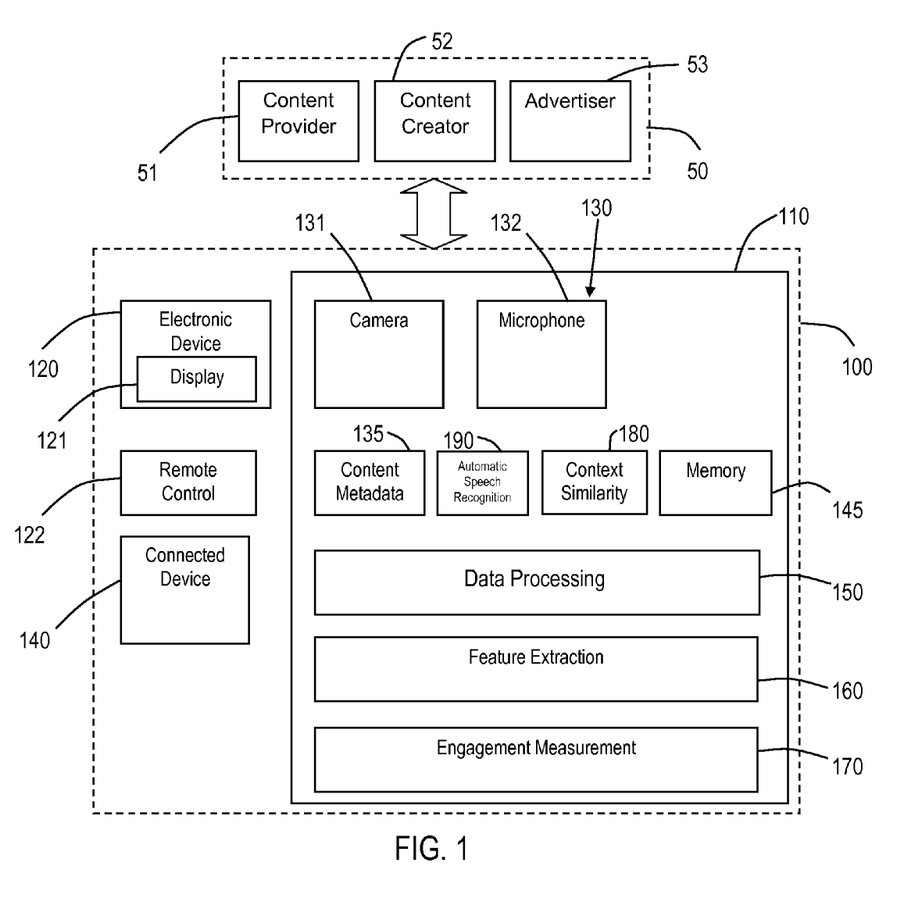
FIG. 1 shows a block diagram of a system for measuring user engagement of content, in accordance with an embodiment.

FIG. 1 shows a block diagram of a system 100 for measuring user engagement of content, in accordance with an embodiment.

In one embodiment, the system 100 comprises at least one electronic device 120. An electronic device 120 may be an appliance, a personal computer (PC), a television, a television component system, or a mobile device (e.g., a mobile phone, a laptop computer). A communication interface 517 (FIG. 7) connects the system 100 to an external network 50 (e.g., content distributors, the Internet) over a wireless connection, a wired connection, or a combination of the two. A network communication protocol such as (e.g., IEEE 802.11a, IEEE 802.11b, IEEE 802.11g, IEEE 802.11n, Bluetooth) is used to facilitate communication between the system 100 and the external network 50.

The electronic device 120 can playback different types of content, including audio and video such as television programs, movies, and advertisements. In one embodiment, the electronic device 120 is configured to receive content for playback from one or more content distributors in the external network 50, such as a content provider 51 (e.g., a television cable company), a content creator 52 (e.g., a video podcaster), or an advertiser 53.

The system further comprises a display 121 for displaying content. In one embodiment, the display 121 is integrated with the electronic device 120. In another embodiment, the display 121 is a separate electronic device 120.

Figure 2:
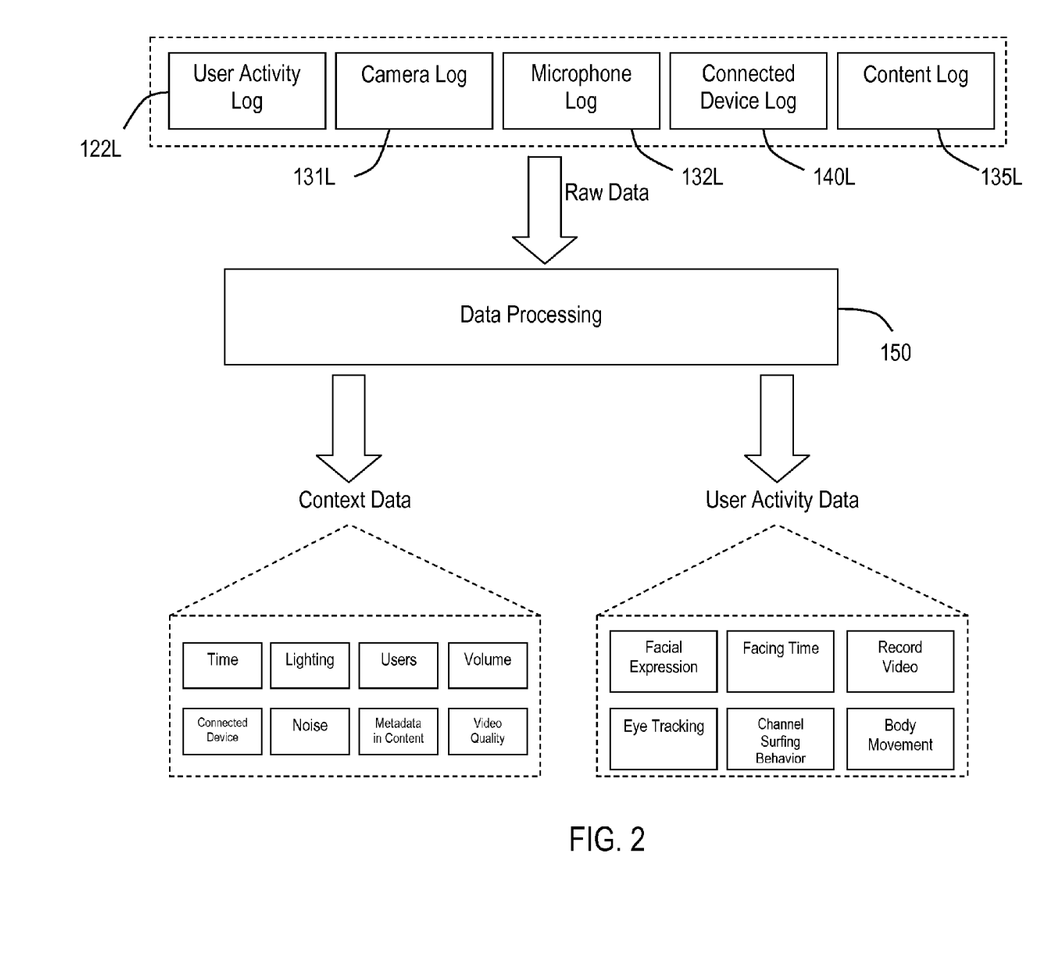
FIG. 2 shows a block diagram of a data processor, in accordance with an embodiment.

The system further comprises a remote control unit 122 that a user may use to control the playback of content on the electronic device 120. Specifically, the remote control unit 122 enables a user to pause, resume, fast-forward, rewind and/or record content playing on the electronic device 120. As described in detail later herein, the system 100 records user interactions with the remote control unit 122 in a user activity log 122L (FIG. 2).

The system 100 further comprises at least one sensor device ("sensor") 130 for capturing sensor data (i.e., inputs). In one embodiment, the system 100 comprises a camera module 131 for capturing videos and/or images. For example, the camera module 131 may comprise a high definition (HD) camera that is capable of capturing videos and/or images in 720p. In one embodiment, the camera module 131 is integrated with the electronic device 120. In another embodiment, the camera module 131 is a separate electronic device 120.

As described in detail later herein, the system 100 uses the camera module 131 to capture user activity data, such as the facial expressions and the body movements of one or more users viewing content playing on the electronic device 120. The camera module 131 may also be positioned such that it captures videos and/or images of the ambient environment (i.e., the area surrounding the electronic device 120). Specifically, the videos and/or images captured by the camera module 131 may be used to determine context data, such as the number of people sitting in front of the electronic device 120, and the lighting conditions of the ambient environment (e.g., the lighting conditions of the room where the electronic device 120 is situated).

In one embodiment, the system 100 further comprises a microphone module 132 for capturing (e.g., recording) audio (i.e., sound) from the ambient environment. In one embodiment, the microphone module 132 is integrated with the electronic device 120. In another embodiment, the microphone module 132 is a separate electronic device 120.

As described in detail later herein, the system 100 uses the microphone module 132 to capture user activity data, such as the words spoken by one or more users viewing content playing on the electronic device 120. The audio captured by the microphone module 132 may also be used to determine context data, such as the noise levels of the ambient environment (e.g., how noisy is the room where the electronic device 120 is situated).

The system 100 further comprises at least one connected device 140. Each connected device 140 is connected to the electronic device 120 over a wireless connection, a wired connection, or a combination of the two. Each connected device 140 runs an interactive program related to the content displayed on the electronic device 120. A user may interact with the interactive program running on a connected device 140 to obtain information about content playing on the electronic device 120 without interrupting the playback of the content on the electronic device 120. In one embodiment, a connected device 140 is a mobile device, such as a mobile phone. As described in detail later herein, the system 100 records user interactions with a connected device 140 in a connected device log 140L (FIG. 2).

The system 100 further comprises a content metadata application module 135 for capturing metadata information associated with the content playing on the electronic device 120. In one embodiment, the content metadata application module 135 captures metadata information from a content distributor in the external network 50, such as a content provider 51, a content creator 52, or an advertiser 53. The metadata information may include programming information from a television programming guide, closed captions, etc. As described in detail later herein, the system 100 uses the metadata information to derive context data. Specifically, the system 100 uses the metadata information to derive context data related to the content displayed on the electronic device 120 (i.e., content context).

The system 100 further comprises a data processing unit 150. The data processing unit 150 processes raw data captured by the system 100. The raw data captured by the system 100 includes videos and/or images captured by the camera module 131, audio captured by the microphone module 132, user interactions with the connected devices 140 and the remote control unit 122, and metadata information captured by the content metadata application module 135. In one embodiment, the data processing unit 150 processes the raw data captured to derive context data and user activity data.

In one embodiment, the system 100 further comprises an automatic speech recognition (ASR) module 190 configured to convert speech in the audio captured by the microphone module 132 into a sequence of words.

The system 100 automatically captures raw data relating to users watching content playing on the electronic device 120, the content playing on the electronic device 120, and the area surrounding the users. As the capture of data does not require explicit user feedback, a user's viewing experience of content playing on the electronic device 120 is uninterrupted.

The system 100 further comprises a feature extraction application module 160 and an engagement measurement application module 170. As described in detail later herein, the feature extraction application module 160 and the engagement measurement application module 170 are used to determine a degree or level of user engagement in a piece of content based on the raw data captured.

Information relating to user engagement of content may be used in many applications, such as a recommendation engine, an intelligent assistant, an intelligent search, user behavior analytics, etc.

The system 100 further comprises a memory unit 145 for maintaining the raw data captured by the system 100.

In one embodiment, the camera module 131, the microphone module 132, the content metadata application module 135, the ASR module 190, the context similarity module 180, the feature extraction application module 160, and the engagement measurement application module 170 are contained in a set-top box 110 that is configured to communicate with the electronic device 120, the remote control unit 122 and the connected device 140 over a wireless connection, a wired connection, or a combination of the two. In another embodiment, the content metadata application module 135, the ASR module 190, the context similarity module 180, the feature extraction application module 160, and the engagement measurement application module 170 are contained on one or more machines, such as a server 552 (FIG. 7), that is configured to communicate with the electronic device 120, the remote control unit 122, the connected device 140, the camera module 131, and the microphone module 132 over a wireless connection, a wired connection, or a combination of the two.

FIG. 2 shows a block diagram of a data processing unit 150, in accordance with an embodiment. In one embodiment, the system 100 maintains the raw data captured by the system 100 as logs. For example, the system 100 maintains a camera log 131L that records videos and/or images captured by the camera module 131, a microphone log 132L that records audio captured by the microphone module 132, a user activity log 122L that records user interactions with the remote control unit 122, a connected device log 140L that records user interactions with a connected device 140, and a content log 135L that records metadata information captured by the content metadata application module 135.

The data processing unit 150 processes the raw data recorded in the logs maintained, and derives context data and user activity data related to the playing on the electronic device 120. Context data comprises two types of information: environmental context and content context. In this specification, information relating to the ambient environment surrounding the electronic device 120 is generally referred to as environmental context, and information relating to the content playing on the electronic device 120 is generally referred to as content context. In one embodiment, the context data derived from the raw data captured includes information such as the time of day, the day of the week, the day of the month, information relating to the electronic device 120 (e.g., the audio and video settings of the electronic device 120), information relating to one or more users watching the content (e.g., the number of people sitting in front of the electronic device), the lighting conditions of the ambient environment, the noise levels of the ambient environment, the video quality of the content displayed, the volume level, information relating to connected devices, information relating to connected users from a social network, the estimated distance between a user and the electronic device 120, etc.

User activity data includes information identifying user actions captured (i.e., tracked or observed) by the system 100. In one embodiment, the user activity data derived from the raw data includes information such as the facial expressions and the body movements of each user, the user interactions with the remote control unit 122 and a connected device 140, etc.

In one embodiment, context data also further includes information relating to an event based context. For example, a user is more likely to be engaged in a basketball game during the NBA playoff season than the regular basketball season.

Figure 3:
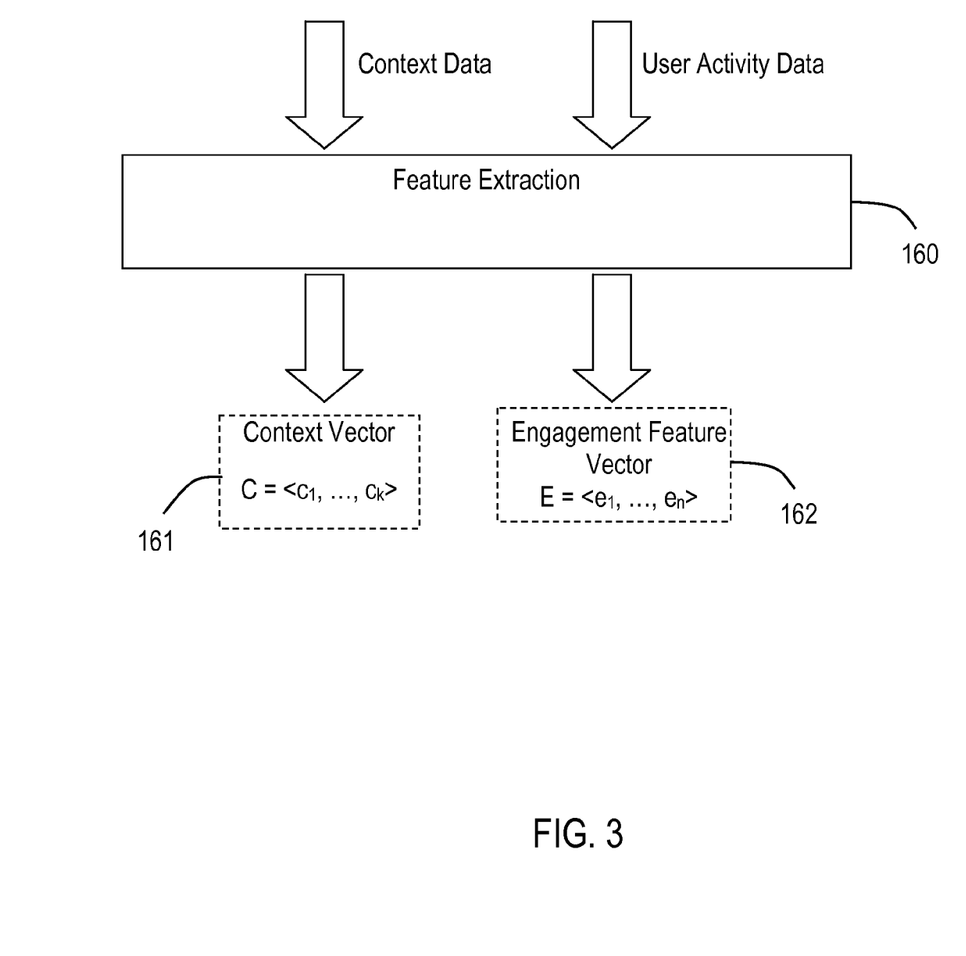
FIG. 3 shows a block diagram of a feature extraction application, in accordance with an embodiment.

FIG. 3 shows a block diagram of a feature extraction application module 160, in accordance with an embodiment. In one embodiment, the feature extraction application module 160 receives context data and user activity data related to content playing on the electronic device 120. Based on the data received, the feature extraction application module 160 generates a context vector 161 and an engagement feature vector 162 corresponding to user engagement of the content playing on the electronic device 120.

In this specification, let C generally denote a context vector 161 for a piece of content, and let $c_i$ denote each entry of the context vector C, wherein i=1, . . . , k. In one embodiment, a context vector 161 corresponding to content includes information representing the environmental context and the content context associated with the content.

In one embodiment, the system 100 functions as a recommendation engine that recommends content for a current context based on a similarity between the current context and a previous context. The system 100 further comprises a context similarity module 180 (FIG. 1) for finding a context vector 161 matching the current context. Specifically, the context similarity module 180 is configured to calculate the similarity between two context vectors 161, such as a first context vector $C_1$ (e.g., a context vector 161 representing the current context) and a second context vector $C_2$ (e.g., a context vector 161 representing a previous context). For example, if a user is likely to be engaged in watching football on Sundays compared to any other time, then it is likely that the user is concentrated in watching football when the noise level of ambient noise surrounding the user is low.

In one embodiment, the similarity between the two context vectors $C_1$ and $C_2$ is calculated using relation (1) below:

$$\text{Similarity} = (C_1 \cdot C_2)/(\|C_1\|\|C_2\|) = (\Sigma^k_{i=1} c_{1i} \times c_{2i})/((\sqrt{(\Sigma^k_{i=1}(c_{1i})^2)})(\sqrt{(\Sigma^k_{i=1})(c_{2i})^2})) \quad (1)$$

wherein $c_{1i}$ represents an entry of the first context vector $C_1$, wherein $c_{2i}$ represents an entry of the second context vector $C_2$, and wherein i=1, . . . , k.

In one embodiment, each entry $c_i$ is converted into a calculable domain by defining an inner product of the entry $c_{1i}$ in the first context vector $C_1$ and $c_{2i}$ in the second context vector $C_2$. For example, for calculating the similarity between two time-based context vectors 161, the system 100 divides time into a plurality of time slots. The two context vectors 161 are in the same time slot if the inner product is 1, and in different time slots if the inner product is zero.

In one embodiment, the similarity between two lighting-based context vectors 161 or two noise-based context vectors 161 are calculated by normalizing each entry $c_{1i}$ and $c_{2i}$ to [0,1].

In one embodiment, an engagement feature vector 162 corresponding to content includes information representing different engagement features 163 (FIG. 4) associated with the content. In this specification, let E generally denote an engagement feature vector 162 for content, and let $e_i$ denote each entry of the engagement feature vector E, wherein i=1, . . . , n. As described in detail later herein, each entry $e_i$ of an engagement feature vector E represents quantitative information corresponding to a particular engagement feature 163 that is observed for the content. For example, an entry $e_i$ of the engagement feature vector E may represent the total duration of time a user is facing the electronic device 120 (e.g., a television) while the content is playing on the electronic device 120.

As the context in which the user watches content is related to the user's engagement in the content, the context vector 161 generated is maintained together with the engagement vector 162 generated in a database, such as a database of the memory unit 145.

Figure 4:
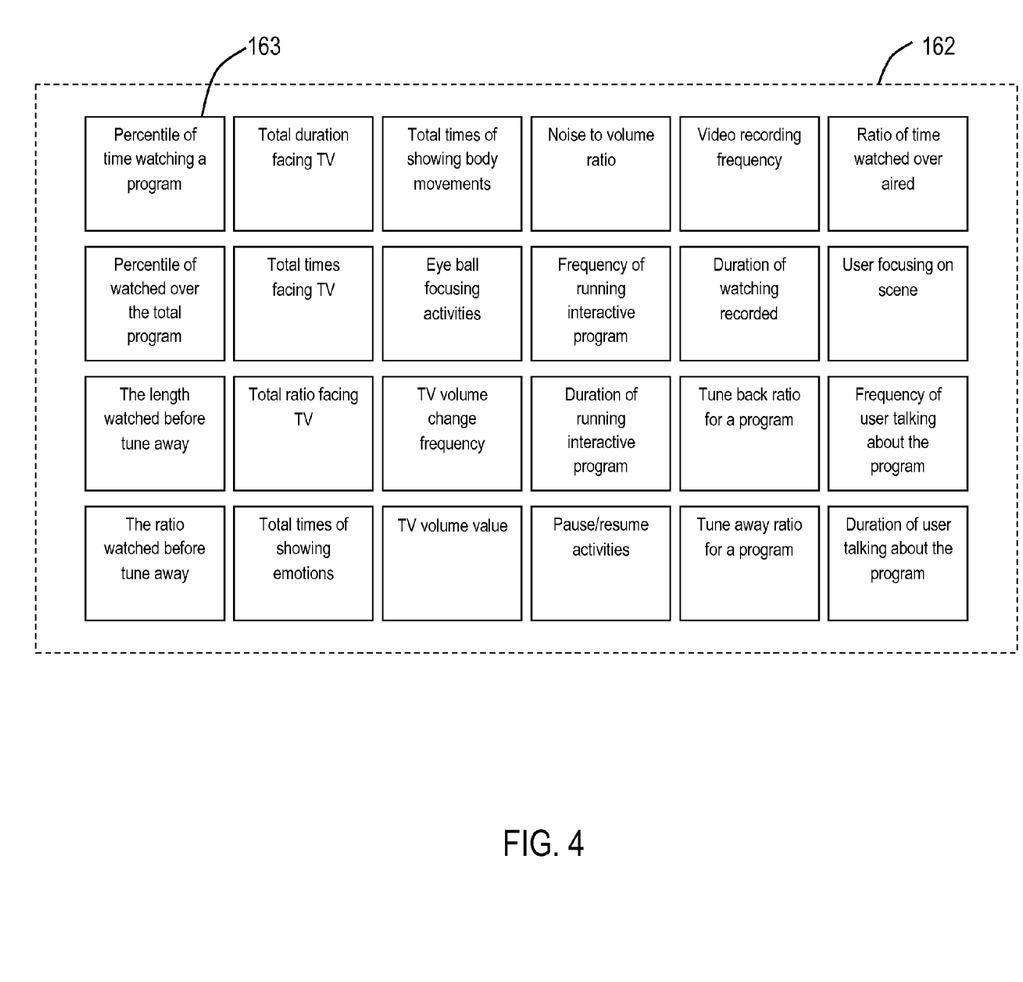
FIG. 4 illustrates an example engagement feature vector including a plurality of engagement features, in accordance with an embodiment.

FIG. 4 illustrates an example engagement feature vector 162 including a plurality of engagement features, in accordance with an embodiment. As described in detail herein below, the feature extraction application module 160 (FIG. 1) is configured to determine a plurality of engagement features 163 for a piece of content based on the context data and the user activity data relating to the piece of content.

In one embodiment, the feature extraction application module 160 is configured to determine the frequency and the duration of time a user is sitting in front of the electronic device 120 while the electronic device 120 is playing a piece of content. For example, based on the raw data recorded in the user activity log 122L and the content log 135L, the feature extraction application module 160 determines the number of times the piece of content is shown during a specific time period, and the number of times the user is watching the piece of content (e.g., the number of times the user is sitting in front of the electronic device 120 to watch the piece of content). For each time the piece of content is shown, the feature extraction application module 160 further determines metrics/statistics relating to the frequency and the duration of time the user is watching the piece of content, such as the percentage of time the user is watching the piece of content, the percentage of the piece of content the user actually watches, and the number of times the user tunes away before the piece of content has ended.

In one embodiment, the feature extraction application module 160 is configured to determine the frequency and the duration a user is facing the electronic device 120 while the electronic device 120 is playing a piece of content. For example, the camera module 131 captures all head movements of users watching the piece of content. Based on the raw data recorded in the camera log 131L, the feature extraction application module 160 determines the number of times the user is facing the electronic device 120 and the duration of time the user is facing the electronic device 120.

In one embodiment, the feature extraction application module 160 is configured to determine the frequency of different facial expressions (e.g., laughter, sadness) exhibited by a user while the electronic device 120 is playing a piece of content. For example, based on the videos and/or images captured by the camera module 131, the feature extraction application module 160 can identify one or more facial expressions of the user, and determine the number of times the user shows a facial expression while watching the piece of content. A user who shows more emotions while watching a piece of content is likely to be more engaged in watching the piece of content.

In one embodiment, the feature extraction application module 160 is configured to determine the frequency of different body movements (e.g., cheering, dancing) exhibited by a user while the electronic device 120 is playing a piece of content. For example, based on the videos and/or images captured by the camera module 131, the feature extraction application module 160 can identify one or more body movements exhibited by the user, and determine the number of times the user exhibits a body movement while watching the piece of content. A user who exhibits more body movements while watching a piece of content is likely to be more engaged in watching the piece of content.

In one embodiment, based on a sequence of words obtained from the ASR module 190 after processing the audio captured by the microphone module 132, the feature extraction application module 160 can determine whether a user is excited or disappointed with a piece content by detecting positive words (e.g., cheer words) or negative words (e.g., curse words) spoken by the user while the user is watching the piece of content.

In one embodiment, the feature extraction application module 160 is configured to determine the frequency and the duration that a user's eyeball focuses on an area of the display 121 while the electronic device 120 is playing a piece of content. For example, based on the videos and/or images captured by the camera module 131, the feature extraction application module 160 tracks the eyeball movement of each user, and determines an area of the display 121 that each user appears to be focused on while the electronic device 120 is playing a piece of content.

In one embodiment, the feature extraction application module 160 is configured to determine an adjustment in volume while the electronic device 120 is playing a piece of content. For example, based on the user activity log 122L, the feature extraction application module 160 determines the number of times a user adjusts the volume while the electronic device 120 is playing the piece of content, and, for each volume adjustment, the volume level the user has increased or decreased the volume to. Adjusting the volume to a higher volume level (i.e., increasing the volume) implies that the user is engaged in the piece of content.

In one embodiment, the feature extraction application module 160 is configured to determine the frequency and the duration of a user's interactions with an interactive program running on a connected device 140, wherein the interactive program relates to a piece of content playing on the electronic device 120. For example, based on the connected device log 140L, the feature extraction application module 160 determines the frequency and the duration of a user's interaction with the interactive program. The more a user interacts with an interactive program for a piece of content, the more likely the user is engaged in the piece of content.

In one embodiment, the feature extraction application module 160 is configured to determine whether a user recorded a piece of content while the electronic device 120 is playing the piece of content. For example, based on the user activity log 122L, the feature extraction application module 160 determines whether the user recorded the piece of content, and the number of times the user watched the recorded piece of content. A user is more likely to be engaged in a piece of content if the user records the piece of content and watches the recorded piece of content a plurality of times.

In one embodiment, the feature extraction application module 160 is configured to determine whether a user paused, and later resumed, a piece of content playing on the electronic device 120. For example, based on the user activity log 122L, the feature extraction application module 160 determines whether the user paused a piece of content and later resumed watching the piece of content. A user is more likely to be engaged in a piece of content if the user resumes watching the piece of content after it has been paused since this may imply that the user does not want to miss any part (e.g., scenes) of the piece of content.

In one embodiment, the feature extraction application module 160 is configured to determine whether a user fast-forwarded or rewinded a piece of content playing on the electronic device 120. For example, based on the user activity log 122L and the content log 135L, the feature extraction application module 160 determines whether the user rewinded the piece of content, fast-forwarded through the piece of content, or fast-forwarded through the advertisements accompanying the piece of content. A user is more likely to be engaged in a piece of content if the user rewinds the piece of content to rewatch a scene. A user is also more likely to be engaged in a piece of content if the user fast-forwards through the advertisements accompanying the piece of content as this implies that the user is eager to watch the piece of content. A user is less likely to be engaged in a piece of content if the user fast-forwards through the piece of content.

In one embodiment, the feature extraction application module 160 is configured to determine the rate a user tunes back to a piece of content playing on the electronic device 120. For example, based on the user activity log 122L, the feature extraction application module 160 determines whether the user tuned back to the piece of content while channel surfing. A user is more likely to be engaged in a piece of content if the user skips the piece of content while channel surfing but eventually tunes back to the piece of content.

In one embodiment, based on the microphone log 132L, the feature extraction application module 160 is configured to determine the frequency and the duration that one or more users is talking about a piece of content playing on the electronic device 120.

In one embodiment, the feature extraction application module 160 is configured to determine, for a linear program such as a television series, the ratio of the duration of time a user watches the program to the total duration of time the program is aired.

Figure 5:
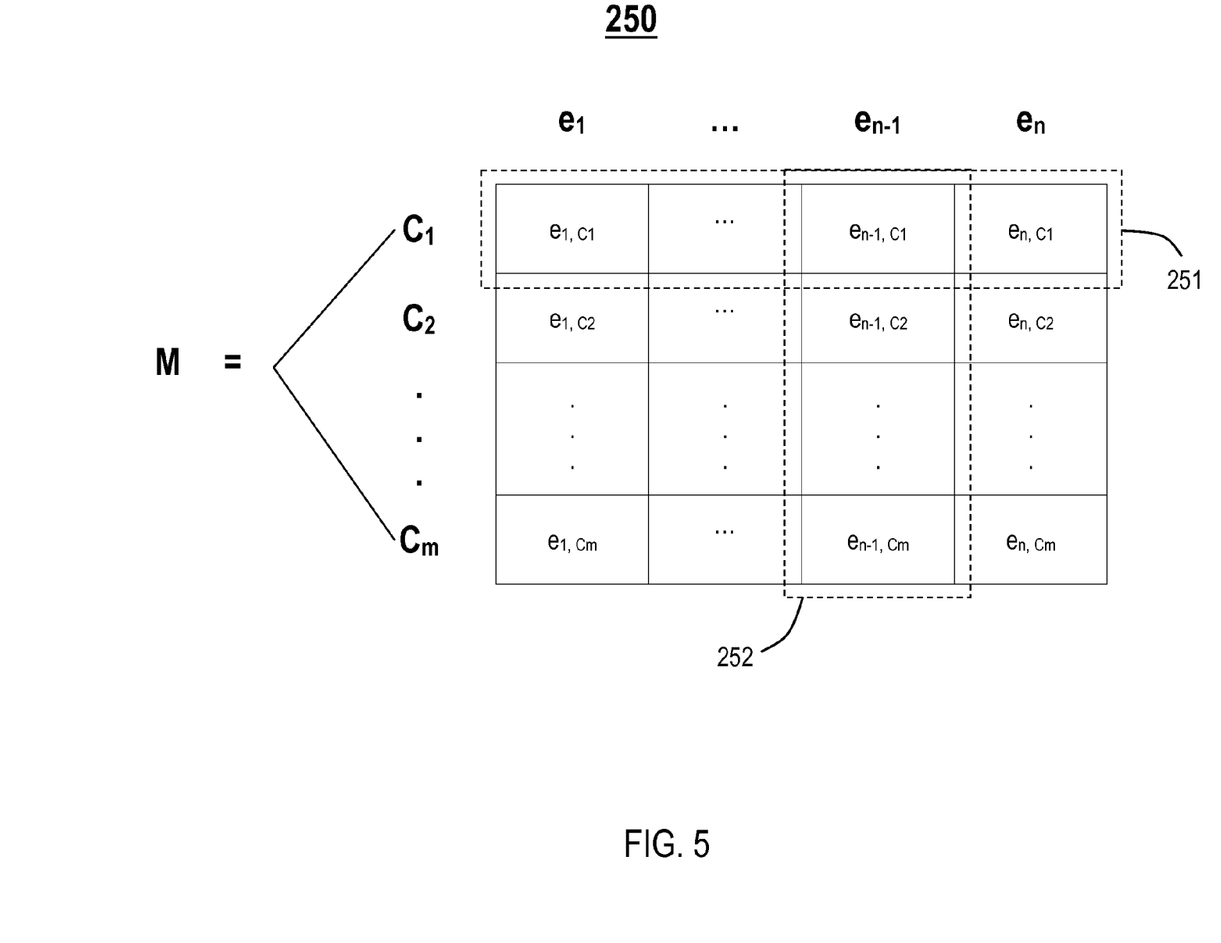
FIG. 5 illustrates a data structure representing correlations between user engagements and associated context, in accordance with an embodiment.

FIG. 5 illustrates a data structure representing correlations between user engagements and associated context, in accordance with an embodiment. The engagement measurement application module 170 maintains a user taste profile model based on a plurality of high-level vectors, such as engagement vectors 162 and context vectors 161. In one embodiment, the model is maintained in the memory unit 145 of the system 100 as a data structure representing a matrix 250, as shown in FIG. 5. The matrix 250 is constructed based on the engagement vectors and context vectors generated by the feature extraction application module 160.

The matrix 250 includes information about user engagements and associated context. In one embodiment, each row 251 of the matrix 250 corresponds to a different context vector 161 representing a particular content consumed in a particular context. Each column 252 of the matrix 250 corresponds to an engagement feature of an engagement vector 162.

In this specification, let M represent an example matrix 250, and let $M_{i,j}$ represent an entry at row i and column j of the matrix M. Each entry $M_{i,j}$ represents a degree or level of user engagement (i.e., engagement score) for a particular engagement feature during user consumption of a particular content in a particular context. The matrix 250 represents different engagement features $e_1, \ldots, e_{n-1}$ and $e_n$ for different context vectors $C_1, C_2, \ldots, C_m$. The matrix 250 thereby represents different engagement features for different content in different contexts.

For example, as shown in FIG. 5, the engagement score $e_{1,C1}$ represents a degree or level of user engagement (i.e., engagement score) for the engagement feature $e_1$ for the context vector $C_1$.

In one embodiment, the engagement measurement application module 170 calculates a total degree or level of user engagement (i.e., total engagement score) for a particular piece of content in a particular context based on the levels of user engagement for all engagement features 163. For example, the engagement measurement application module 170 calculates a total degree or level of user engagement (i.e., total engagement score) for a particular piece of content in a particular context using relation (2) below:

$$\text{Total degree or level of user engagement} = \Sigma_{i=1}^{n} w_i \times e_i \qquad (2)$$

wherein n is the total length of the engagement vector 162, wherein $e_i \in [0,1]$ such that $e_i$ represents a normalized engagement feature, wherein $w_i \in [0,1]$ represents a weight for a corresponding entry $e_i$, and wherein $\Sigma_{i=1}^{n} w_i = 1$.

In one embodiment, the weight $w_i$ for a corresponding entry $e_i$ is dependent on context data. In one embodiment, the engagement measurement application module 170 is programmed to assign different weights to different engagement features 163 based on the type of user watching the electronic device. For example, for children aged six and below, engagement features 163 such as the type of content and the estimated distance between the electronic device 120 and the user are assigned higher weights compared to other engagement features such as noise levels and connected devices.

In one embodiment, if a group of users is watching content on the electronic device 120, the engagement measurement application module 170 is programmed to assign higher weights to engagement features 163 such as facial expressions and body movements compared to other engagement features 163 such as noise levels.

In one embodiment, if the type of content playing on the electronic device 120 is linear programming (e.g., a television program series), the engagement measurement application module 170 is programmed to assign lower weights to engagements features such as rewinding, fast-forwarding, pausing and resuming content.

In one embodiment, if the electronic device 120 is sharing information with a connected device 140, the engagement measurement application module 170 is programmed to assign lower weights to engagement features such as the amount of time a user is facing the electronic device 120.

In one embodiment, the engagement measurement application module 170 uses a supervised learning approach to determine weights for different contexts.

The degree or level of user engagement measured may be detailed/extensive. For example, the level of user engagement for a particular scene/video element of a piece of content is measured when the user views the particular scene/video element.

The measurements calculated by the system 100 may be beneficial to content providers 51, content creators 52 and advertisers 53. For example, a content provider 51 can adjust future content based on the measurements calculated. A content provider 51 can also maximize profits by optimizing the television programming schedule based on the measurements calculated. Advertisers 53 can also provide more focused advertisements based on the measurements calculated.

Figure 6:
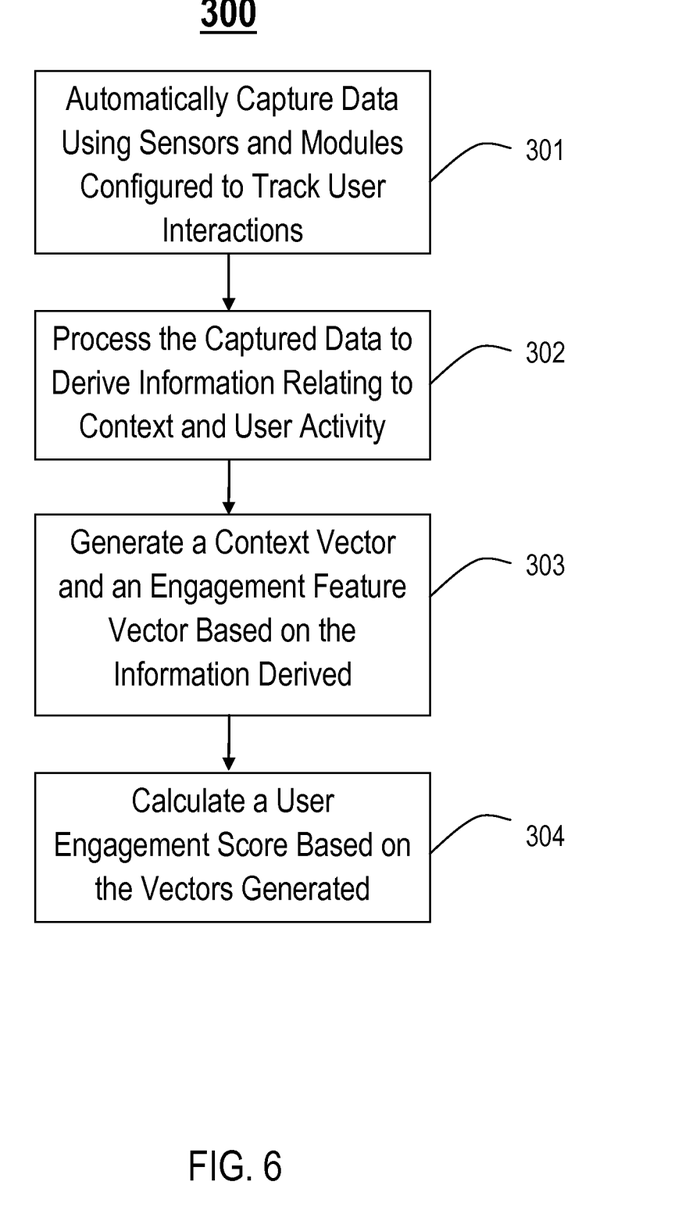
FIG. 6 illustrates an example flow chart for measuring user engagement of content, according to an embodiment.

FIG. 6 illustrates an example flow chart 300 for measuring user engagement of content, according to an embodiment. In process block 301, data is automatically captured using sensors and modules tracking user interactions. In process block 302, the captured data is processed to derive information relating to user context and user activity. In process block 303, a context vector and an engagement feature vector are generated based on the information derived. In process block 304, a user engagement score is calculated based on the vectors generated.

Figure 7:
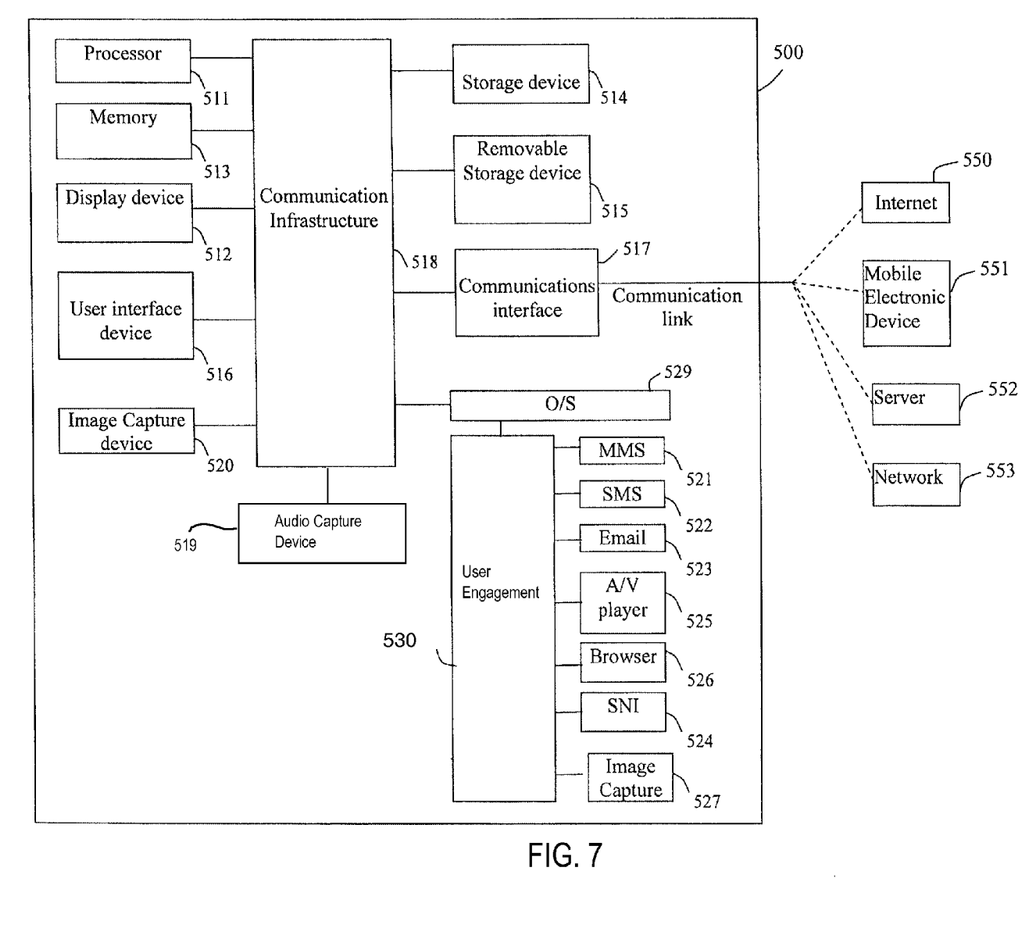
FIG. 7 is a high-level block diagram showing an information processing system comprising a computing system implementing an embodiment.

FIG. 7 is a high-level block diagram showing an information processing system comprising a computing system 500 implementing an embodiment. The system 500 includes one or more processors 511 (e.g., ASIC, CPU, etc.), and can further include an electronic display device 512 (for displaying graphics, text, and other data), a main memory 513 (e.g., random access memory (RAM)), storage device 514 (e.g., hard disk drive), removable storage device 515 (e.g., removable storage drive, removable memory module, a magnetic tape drive, optical disk drive, computer-readable medium having stored therein computer software and/or data), user interface device 516 (e.g., keyboard, touch screen, keypad, pointing device), and a communication interface 517 (e.g., modem, wireless transceiver (such as WiFi, Cellular), a network interface (such as an Ethernet card), a communications port, or a PCMCIA slot and card). The communication interface 517 allows software and data to be transferred between the computer system and external devices and/or networks, such as the Internet 550, a mobile electronic device 551, a server 552, and a network 553. The system 500 further includes a communications infrastructure 518 (e.g., a communications bus, cross-over bar, or network) to which the aforementioned devices/modules 511 through 517 are connected.

The information transferred via communications interface 517 may be in the form of signals such as electronic, electromagnetic, optical, or other signals capable of being received by communications interface 517, via a communication link that carries signals and may be implemented using wire or cable, fiber optics, a phone line, a cellular phone link, an radio frequency (RF) link, and/or other communication channels.

The system 500 further includes an image capture device 520 such as a camera 131 and an audio capture device 519 such as a microphone 132. The system 500 may further include application modules as MMS module 521, SMS module 522, email module 523, social network interface (SNI) module 524, audio/video (AV) player 525, web browser 526, image capture module 527, etc.

The system 500 further includes a user engagement module 530 for measuring user engagement of content as described herein, according to an embodiment. In one embodiment, the user engagement module 530 along with an operating system 529 may be implemented as executable code residing in a memory of the system 500. In another embodiment, the user engagement module 530 along with the operating system 529 may be implemented in firmware.

As is known to those skilled in the art, the aforementioned example architectures described above, according to said architectures, can be implemented in many ways, such as program instructions for execution by a processor, as software modules, microcode, as computer program product on computer readable media, as analog/logic circuits, as application specific integrated circuits, as firmware, as consumer electronic devices, AV devices, wireless/wired transmitters, wireless/wired receivers, networks, multi-media devices, etc. Further, embodiments of said architecture can take the form of an entirely hardware embodiment, an entirely software embodiment or an embodiment containing both hardware and software elements.

Embodiments have been described with reference to flowchart illustrations and/or block diagrams of methods, apparatus (systems) and computer program products according to one or more embodiments. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic, implementing embodiments. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Computer program instructions representing the block diagram and/or flowcharts herein may be loaded onto a computer, programmable data processing apparatus, or processing devices to cause a series of operations performed thereon to produce a computer implemented process. Computer programs (i.e., computer control logic) are stored in main memory and/or secondary memory. Computer programs may also be received via a communications interface. Such computer programs, when executed, enable the computer system to perform the features as discussed herein. In particular, the computer programs, when executed, enable the processor and/or multi-core processor to perform the features of the computer system. Such computer programs represent controllers of the computer system. A computer program product comprises a tangible storage medium readable by a computer system and storing instructions for execution by the computer system for performing a method of one or more embodiments.

Though embodiments have been described with reference to certain versions thereof; however, other versions are possible. Therefore, the spirit and scope of the appended claims should not be limited to the description of the preferred versions contained herein.

What is claimed is:

1. A system for measuring user engagement of content, comprising:
   one or more processors; and
   a data storage device storing instructions that when executed by said one or more processors causes said one or more processors to perform operations including:
      determining context data and user activity data associated with playback of a piece of content on a first electronic device, wherein said user activity data relates to user activity of at least one user in response to said playback, and said context data relates to a surrounding ambient environment of said first electronic device, content type of said piece of content, user type of said at least one user, and device activity of said first electronic device;
      measuring a degree of user engagement for at least one engagement feature based on said context data and said user activity data;
      for each degree of user engagement measured, determining a corresponding weighted degree of user engagement based on a corresponding weight assigned to said degree of user engagement measured, wherein each weight assigned to each degree of user engagement measured is based on said context data and said user activity data; and providing user engagement data indicative of each weighted degree of user engagement to a content distributor, wherein additional content available for playback on said first electronic device from said content distributor is adjusted based on said user engagement data.

2. The system of claim 1, wherein:
said context data comprises one or more of: an image of said surrounding ambient environment, a video of said surrounding ambient environment, or audio of said surrounding ambient environment.

3. The system of claim 1, wherein:
said content distributor comprises one or more of: a content provider, a content creator, or an advertiser; and
said additional content comprises one or more of: another piece of content, an advertisement, or a television programming schedule.

4. The system of claim 1, wherein:
said user activity data comprises one or more of: an image of said user activity, a video of said user activity, or audio of said user activity.

5. The system of claim 1, wherein:
said user activity data comprises one or more of: a facial expression of said at least one user, a body movement of said at least one user, a user interaction of said at least one user with said piece of content via at least one input device; and
said at least one input device includes at least one of the following: a remote control unit, and a second electronic device connected to said first electronic device.

6. The system of claim 1, wherein:
said context data comprises data indicative of one or more of: a lighting condition of said surrounding ambient environment, or a noise level of said surrounding ambient environment.

7. The system of claim 1, wherein:
said operations further include:
capturing metadata relating to said piece of content; and
extracting different engagement features from said context data and said user activity data;
different weights are assigned for different contexts; and
each degree of user engagement for each engagement feature is an engagement score corresponding to said engagement feature.

8. The system of claim 1, wherein:
said context data comprises data indicative of at least one of the following: said content type of said piece of content, an estimated distance between said first electronic device and said at least one user, a noise level of said surrounding ambient environment, number of one or more other devices connected to said first electronic device for information sharing, a facial expression of said at least one user, a body movement of said at least one user, rewinding of said piece of content, fast-forwarding of said piece of content, pausing of said piece of content, resuming of said piece of content, an amount of time said at least one user is facing said first electronic device.

9. A method for measuring user engagement of content, comprising:
determining context data and user activity data associated with playback of a piece of content on a first electronic device, wherein said user activity data relates to user activity of at least one user in response to said playback, and said context data relates to a surrounding ambient environment of said first electronic device, content type of said piece of content, user type of said at least one user, and device activity of said first electronic device;

measuring, by one or more processors, a degree of user engagement for at least one engagement feature based on said context data and said user activity data;

for each degree of user engagement measured, determining a corresponding weighted degree of user engagement based on a corresponding weight assigned to said degree of user engagement measured, wherein each weight assigned to each degree of user engagement measured is based on said context data and said user activity data; and providing user engagement data indicative of each weighted degree of user engagement to a content distributor, wherein additional content available for playback on said first electronic device from said content distributor is adjusted based on said user engagement data.

10. The method of claim 9, wherein:
said context data comprises one or more of: an image of said surrounding ambient environment, a video of said surrounding ambient environment, or audio of said surrounding ambient environment.

11. The method of claim 9, wherein:
said content distributor comprises one or more of: a content provider, a content creator, or an advertiser; and
said additional content comprises one or more of: another piece of content, an advertisement, or a television programming schedule.

12. The method of claim 9, wherein:
said user activity data comprises one or more of: an image of said user activity, a video of said user activity, or audio of said user activity.

13. The method of claim 9, wherein:
said user activity data comprises one or more of: a facial expression of said at least one user, a body movement of said at least one user, a user interaction of said at least one user with said piece of content via at least one input device; and
said at least one input device includes at least one of the following: a remote control unit, and a second electronic device connected to said first electronic device.

14. The method of claim 9, wherein:
said context data comprises data indicative of one or more of: a lighting condition of said surrounding ambient environment, or a noise level of said surrounding ambient environment.

15. The method of claim 9, further comprising:
capturing metadata relating to said piece of content; and
extracting different engagement features from said context data and said user activity data;
wherein different weights are assigned for different contexts; and
wherein each degree of user engagement for each engagement feature is an engagement score corresponding to said engagement feature.

16. The method of claim 15, further comprising:
maintaining information relating to user engagement of different pieces of content in different contexts.

17. A non-transitory computer-readable medium storing instructions that, when executed by one or more processors of a machine, cause the machine to perform operations comprising:

determining context data and user activity data associated with playback of a piece of content on a first electronic device, wherein said user activity data relates to user activity of at least one user in response to said playback, and said context data relates to a surrounding ambient environment of said first electronic device, content type of said piece of content, user type of said at least one user, and device activity of said first electronic device;

measuring a degree of user engagement for at least one engagement feature based on said context data and said user activity data;

for each degree of user engagement measured, determining a corresponding weighted degree of user engagement based on a corresponding weight assigned to said degree of user engagement measured, wherein each weight assigned to each degree of user engagement measured is based on said context data and said user activity data; and providing user engagement data indicative of each weighted degree of user engagement to a content distributor, wherein additional content available for playback on said first electronic device from said content distributor is adjusted based on said user engagement data.

18. The medium of claim 17, wherein:

said context data comprises one or more of: an image of said surrounding ambient environment, a video of said surrounding ambient environment, or audio of said surrounding ambient environment.

19. The medium of claim 17, wherein:

said content distributor comprises one or more of: a content provider, a content creator, or an advertiser; and said additional content comprises one or more of: another piece of content, an advertisement, or a television programming schedule.

20. The medium of claim 17, wherein:

said user activity data comprises one or more of: an image of said user activity, a video of said user activity, or audio of said user activity.

21. The medium of claim 17, wherein:

said user activity data comprises one or more of: a facial expression of said at least one user, a body movement of said at least one user, a user interaction of said at least one user with said piece of content via at least one input device; and said at least one input device includes at least one of the following: a remote control unit, and a second electronic device connected to said first electronic device.

22. The medium of claim 17, wherein:

said context data comprises data indicative of one or more of: a lighting condition of said surrounding ambient environment, or a noise level of said surrounding ambient environment.

23. The medium of claim 17, said operations further comprising:

capturing metadata relating to said piece of content; and extracting different engagement features from said context data and said user activity data;

wherein different weights are assigned for different contexts; and wherein each degree of user engagement for each engagement feature is an engagement score corresponding to said engagement feature.

24. The medium of claim 23, said operations further comprising:

maintaining information relating to user engagement of different pieces of content in different contexts.

25. A non-transitory computer-readable medium storing instructions that, when executed by one or more processors of a machine, cause the machine to perform operations comprising:

receiving context data and user activity data associated with playback of a piece of content on a first electronic device, wherein said user activity data relates to user activity of at least one user in response to said playback, and said context data relates to a surrounding ambient environment of said first electronic device, content type of said piece of content, user type of said at least one user, and device activity of said first electronic device;

measuring a degree of user engagement for at least one engagement feature based on said context data and said user activity data;

for each degree of user engagement measured, determining a corresponding weighted degree of user engagement based on a corresponding weight assigned to said degree of user engagement measured, wherein each weight assigned to each degree of user engagement measured is based on said context data and said user activity data; and providing user engagement data indicative of each weighted degree of user engagement to a content distributor, wherein additional content available for playback on said first electronic device from said content distributor is adjusted based on said user engagement data.

26. The medium of claim 25, wherein:

said context data comprises one or more of: an image of said surrounding ambient environment, a video of said surrounding ambient environment, or audio of said surrounding ambient environment.

27. The medium of claim 25, wherein:

said content distributor comprises one or more of: a content provider, a content creator, or an advertiser; and said additional content comprises one or more of: another piece of content, an advertisement, or a television programming schedule.

28. The medium of claim 25, wherein:

said user activity data comprises one or more of: an image of said user activity, a video of said user activity, or audio of said user activity.

29. The medium of claim 25, wherein:

said operations further include:

capturing metadata relating to said piece of content; and extracting different engagement features from said context data and said user activity data;

different weights are assigned for different contexts; and each degree of user engagement for each engagement feature is an engagement score corresponding to said engagement feature.

30. The medium of claim 29, wherein said operations further include:

maintaining information relating to user engagement of different pieces of content in different contexts.

* * * * *